US009037372B2

(12) United States Patent
Hashizaka et al.

(10) Patent No.: US 9,037,372 B2
(45) Date of Patent: May 19, 2015

(54) OUTPUT TORQUE CONTROL SYSTEM (75) Inventors: Akira Hashizaka, Okazaki (JP); Yoshiaki Sano, Okazaki (JP); Hiroaki Miyamoto, Okazaki (JP); Toshiyuki Matsumi, Nagoya (JP); Norihiko Hatsumi, Anjo (JP); Takanori Sugimoto, Tsuhima (JP); Yasuyuki Hatsuda, Okazaki (JP); Noritaka Terakawa, Okazaki (JP); Tsuyoshi Takeo, Toyota (JP); Yutaka Nakagi, Ichinomiya (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 367 days.

(21) Appl. No.: 13/413,290

(22) Filed: Mar. 6, 2012

(65) Prior Publication Data
US 2012/0232735 A1 Sep. 13, 2012

(30) Foreign Application Priority Data

Mar. 7, 2011 (JP) ................................ 2011-049049

(51) Int. Cl.
*B60L 15/20* (2006.01)
*B60L 11/18* (2006.01)

(52) U.S. Cl.
CPC ............ *B60L 15/20* (2013.01); *B60L 11/1803* (2013.01); *B60L 2240/12* (2013.01);
(Continued)

(58) Field of Classification Search
CPC . B60L 15/20; B60L 15/2072; B60L 2250/26; B60L 2250/28; B60L 2240/10; B60L 2240/12; B60L 2240/14; B60L 11/1803
USPC ................................................... 701/22, 70
See application file for complete search history.

(56) References Cited

U.S. PATENT DOCUMENTS 4,823,753 A * 4/1989 Murakami et al. ............ 123/306
5,532,929 A * 7/1996 Hattori et al. ................. 701/110
(Continued)

FOREIGN PATENT DOCUMENTS

CN       101200170 A      6/2008
DE    102004014102    * 10/2005 ............. B60K 41/04
(Continued)

OTHER PUBLICATIONS

Chinese Office Action issued Jan. 26, 2014 for related Application No. 201210058788.2 with English translation.
(Continued)

*Primary Examiner* — John Q Nguyen
*Assistant Examiner* — Michael Whalen
(74) *Attorney, Agent, or Firm* — Birch, Stewart, Kolasch & Birch, LLP (57) ABSTRACT An output torque control system includes a control unit which includes an acceleration mode detection unit and an output torque control unit. The acceleration mode detection unit selects a normal acceleration mode which includes output torque information indicating an increased amount of output torque of an electric motor as time elapses or a rapid acceleration mode which includes output torque information indicating the increased amount of output torque of the electric motor as time elapses more largely than in the normal acceleration mode based on a result of a detection by a depressing speed detection unit. The output torque control unit selects one of the output torque information which corresponds to the result of the detection by the acceleration mode detection unit to control the output torque produced by the electric motor based on the selected output torque information.

1 Claim, 9 Drawing Sheets (52) U.S. Cl.
CPC ....... *B60L 2240/423* (2013.01); *B60L 2240/80* (2013.01); *B60L 2250/28* (2013.01); *Y02T 10/642* (2013.01); *Y02T 10/7005* (2013.01); B60L 15/2072 (2013.01); *B60L 2240/42* (2013.01); *B60L 2250/26* (2013.01); *Y02T 10/7275* (2013.01)

(56) References Cited

U.S. PATENT DOCUMENTS

| | | | |
|---|---|---|---|
| 5,845,731 A * | 12/1998 | Buglione et al. | 180/65.23 |
| 6,855,092 B2 * | 2/2005 | Duty et al. | 477/121 |
| 8,594,874 B2 * | 11/2013 | Katano | 701/22 |
| 8,617,029 B2 * | 12/2013 | Kabe et al. | 477/37 |
| 8,657,720 B2 * | 2/2014 | Kabe et al. | 477/43 |
| 2007/0083316 A1 * | 4/2007 | Kurz et al. | 701/93 |
| 2007/0197342 A1 * | 8/2007 | Strenkert | 477/37 |
| 2009/0105895 A1 * | 4/2009 | Shige | 701/22 |
| 2010/0082189 A1 | 4/2010 | Xu et al. | |
| 2012/0095637 A1 * | 4/2012 | Katano | 701/22 |

FOREIGN PATENT DOCUMENTS

| | | | | |
|---|---|---|---|---|
| JP | 7-144619 A | 8/1995 | | |
| JP | 9-331604 A | 12/1997 | | |
| JP | 2001-204105 A | 7/2001 | | |
| JP | 2003-169402 A | 6/2003 | | |
| JP | 2006-6078 A | 1/2006 | | |
| WO | WO 2010146421 A2 * | 12/2010 | | B60L 11/18 |
| WO | WO 2010146421 A3 * | 5/2011 | | |

OTHER PUBLICATIONS

Japanese Office Action issued Dec. 26, 2013 for related Application No. 2011-049049 with English translation.

* cited by examiner

OUTPUT TORQUE CONTROL SYSTEM

BACKGROUND

The present invention is related to an output torque control system for controlling output torque produced by an electric motor.

There is proposed, for vehicles including an electric motor as a drive source thereof, techniques for controlling torque outputted from the electric motor in accordance with a depressing amount of an accelerator pedal (refer to Patent Literature 1).

When a vehicle is started, the vehicle is started to be accelerated rapidly or is started so that the vehicle speed increases moderately. When the vehicle is accelerated rapidly, it is required that the output torque of the electric motor increases momentarily. When the vehicle speed is increased moderately, it is required that the output torque of the electric motor increases moderately.

In the case of the technique disclosed in Patent Literature 1, however, when the accelerator pedal is depressed in the same amount, the output torque of the electric motor increases equally in both cases where the vehicle is accelerated rapidly and where the vehicle speed increases moderately.

Because of this, with the technique disclosed in Patent Literature 1, it is difficult to accelerate the vehicle as desired by the driver.

[Patent Literature 1] JP-A-7-144619

SUMMARY

It is therefore one advantageous aspect of the present invention to provide an output torque control system which enables a vehicle to be accelerated as required by the driver.

According to one advantage of the invention, there is provided:

An output torque control system comprising:
an electric motor configured to rotate a driving wheel to run a vehicle;
a depressing speed detection unit configured to detect a depressing speed at which an accelerator pedal is depressed by a driver of the vehicle; and
a control unit configured to control output torque produced by the electric motor,
wherein the control unit includes;
an acceleration mode detection unit configured to select a normal acceleration mode which includes output torque information indicating an increased amount of output torque of the electric motor as time elapses or a rapid acceleration mode which includes output torque information indicating the increased amount of output torque of the electric motor as time elapses more largely than in the normal acceleration mode based on a result of a detection by the depressing speed detection unit; and
an output torque control unit configured to select one of the output torque information which corresponds to the result of the detection by the acceleration mode detection unit to control the output torque produced by the electric motor based on the selected output torque information.

The output torque control system may further comprise a vehicle speed detection unit configured to detect a vehicle speed of the vehicle. The output torque information of the normal acceleration mode and the output torque information of the rapid acceleration mode may include first information indicating the increased amount of the output torque in a state where the vehicle speed when the accelerator pedal is depressed is larger than a predetermined speed and second information indicating the increased amount of the output torque in a state where the vehicle speed when the accelerator pedal is depressed is not smaller than zero and not larger than the predetermined speed and indicating the increased amount of the output torque is larger than the increased amount in the first information. The output torque control unit, may determine whether or not the vehicle speed when the accelerator pedal is depressed is larger than the predetermined speed based on the result of a detection by the vehicle speed detection unit so as to select the first information or the second information, and control the output torque produced by the electric motor based on the selected information.

The output torque control system may be configured such that: the second information has initial output torque information which keeps the increased amount of the output torque smaller during a predetermined period in an initial stage of depression of the accelerator pedal than in other stages, and the predetermined period is set longer in the normal acceleration mode than in the rapid acceleration mode.

DETAILED DESCRIPTION OF EXEMPLIFIED EMBODIMENTS

An output torque control system according to an embodiment of the invention will be described by reference to FIGS.

Figure 1:
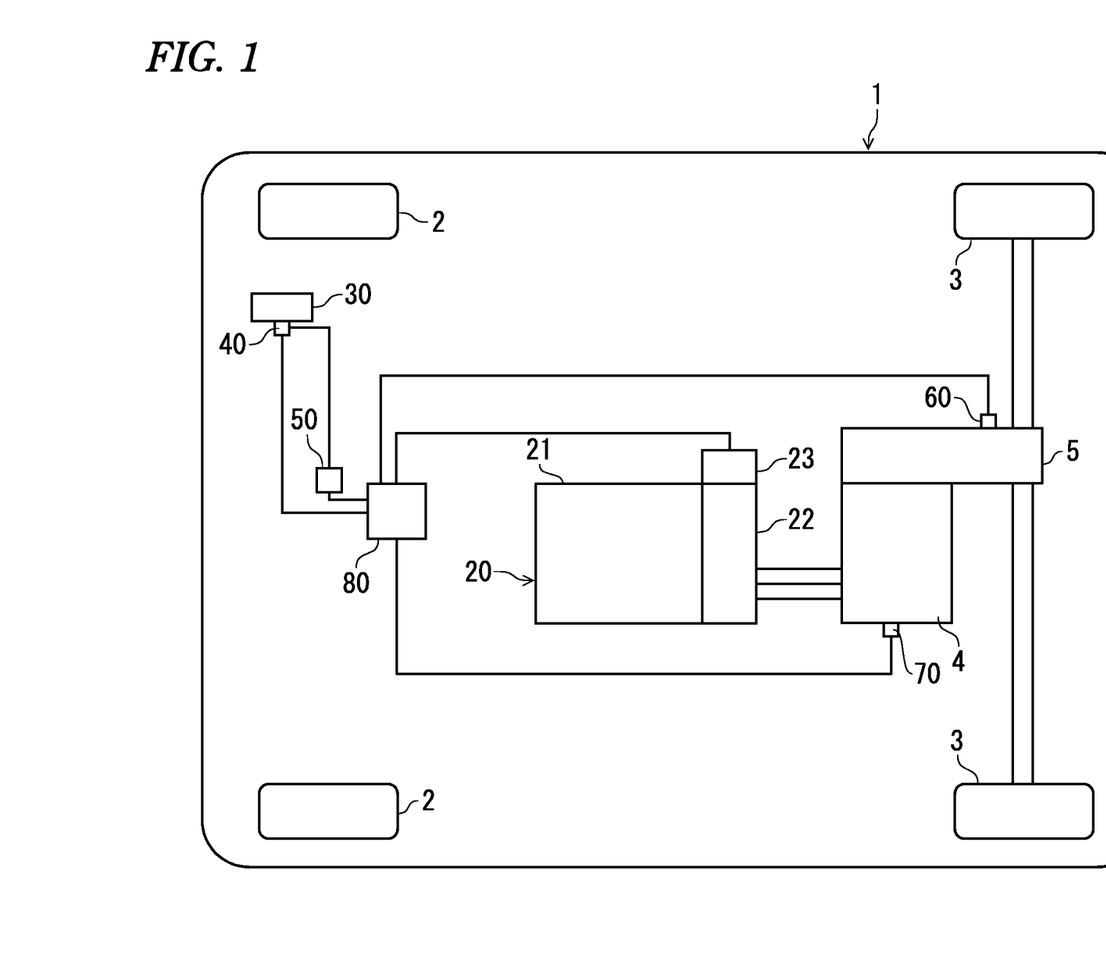
FIG. 1 is a schematic view showing a motor vehicle which includes an output torque control system according to an embodiment of the invention.

1 to 9. FIG. 1 is a schematic drawing showing a motor vehicle 1 which includes an output torque control system 100 of this embodiment. As is shown in FIG. 1, the motor vehicle 1 includes a pair of front wheels 2, a pair of rear wheels 3, an electric motor 4 as an example of an electric motor and a reduction gear 5 and is an electric vehicle which can be driven by the electric motor 4. The rear wheels 3 are connected to the electric motor 4 via the reduction gear 5. The rotation of the electric motor 4 is transmitted to the rear wheels 3 via the reduction gear 5. As this occurs, the rear wheels 3 start to rotate to drive the motor vehicle 1. The rear wheels 3 constitute driving wheels which are rotated by the electric motor 4.

The motor vehicle 1 also includes a battery unit 20 for supplying electric power to the electric motor 4, an accelerator pedal 30, an acceleration sensor 40, a depressing speed detection unit 50, a vehicle speed sensor 60 for outputting a signal corresponding to a vehicle speed, an output torque sensor 70, and a main control unit 80.

The battery unit 20 includes a battery main body 21 which includes plural battery cells, an inverter 22 which connects the battery main body 21 with the electric motor 4 for controlling the electric power supplied from the battery main body 21 to the electric motor 4 and a motor control unit 23. The motor control unit 23 controls the inverter 22 by a command, which will be described later, transmitted from the motor control unit 23.

The accelerator pedal 30 is provided in a front part of a vehicle body. The driver depresses the accelerator pedal 30 to drive the vehicle 1. The acceleration sensor 40 detects a depressing amount of the accelerator pedal 30 and outputs a signal which corresponds to the depressing amount detected. When referred to in this specification, the depressing amount means a depressing amount of the accelerator pedal 30 from a position where the accelerator pedal 30 is not depressed, that is, an initial position A0 of the accelerator pedal 30. In other words, the depressing amount is a position of the accelerator pedal 30 relative to the initial position A0.

The depressing speed detection unit 50 is connected to the acceleration sensor 40 to receive an output signal which is outputted from the acceleration sensor 40. The depressing speed detection unit 50 detects a depressing speed of the accelerator pedal 30 based on the output signal from the acceleration sensor 40. The detection of the depressing speed will be described specifically. The depressing speed detection unit 50 detects a change in depressing amount of the accelerator pedal 30 based on the output signal from the acceleration sensor 40 and detects a depressing speed of the accelerator pedal 30 based on the change in depressing amount and time spent for the change.

The vehicle speed sensor 60 detects a signal which corresponds to a rotation speed of an output shaft of the reduction gear 5. The vehicle speed may be detected based on a wheel speed. As this occurs, the speed of a particular wheel may be regarded as a vehicle speed or an average wheel speed of plural wheels may be regarded as a vehicle speed. The output torque sensor 70 is provided on the electric motor 4. The output torque sensor 70 outputs a signal which corresponds to an output torque of the electric motor 4.

The main control unit 80 is connected to the acceleration sensor 40, the vehicle speed sensor 60, the motor control unit 23, the output torque sensor 70 and the depressing speed detection unit 50 and receives signals which are outputted from these constituent components.

The main control unit 80 obtains a depressing amount of the accelerator pedal 30 based on the output signal received from the acceleration sensor 40. In addition, the main control unit 80 obtains an output torque that the electric motor 4 requires based on the depressing amount of the accelerator pedal 30. The main control unit 80 holds information on the output torque of the electric motor 4 which varies so as to correspond to the depressing amount of the accelerator pedal 30.

The main control unit 80 obtains a vehicle speed of the motor vehicle 1 based on the output signal received from the vehicle speed sensor 60. The main control unit 80 obtains a value of the output torque of the electric motor 4 based on the signal received from the output torque sensor 70. The main control unit 80 obtains a depressing speed of the accelerator pedal 30 based on the output signal from the depressing speed detection unit 50.

The motor vehicle 1 has, as acceleration modes, a normal acceleration mode and a rapid acceleration mode. When the depressing speed of the accelerator pedal 30 is zero, neither of the acceleration modes is attained, and the main control unit 80 determines that the vehicle is running in a stable fashion.

When the depressing speed of the accelerator pedal 30 is larger than zero and is not larger than a first predetermined speed V1, the main control unit 80 determines that the motor vehicle 1 is in the normal acceleration mode. Here, the depressing speed which is not larger than the first predetermined speed V1 also includes the first predetermined speed V1.

In the rapid acceleration mode, the speed of the motor vehicle 1 increases faster than in the normal acceleration mode. In other words, in the rapid acceleration mode, the output torque of the electric motor 4 increases faster than in the normal acceleration mode as time elapses. When the depressing speed of the accelerator pedal 30 is larger than the first predetermined speed V1, the main control unit 80 determines that the vehicle is in the rapid acceleration mode.

The first predetermined speed V1 is a threshold depressing speed which separates the normal acceleration mode from the rapid acceleration mode. The first predetermined speed V1 can be set arbitrarily. For example, a depressing speed of the accelerator pedal 30 at which the motor vehicle 1 is accelerated during normal driving is obtained through experiments, and this depressing speed may be regarded as the first predetermined speed.

When the motor vehicle 1 is in the normal acceleration mode, the main control unit 80 sends to the motor control unit 23 a command that the output torque of the electric motor 4 is to increase along an output torque rising pattern P for the normal acceleration mode. The main control unit 80 includes a storage unit and stores in advance information on a output torque rising pattern P for the normal acceleration mode in the storage unit.

The output torque rising pattern P for the normal acceleration mode includes a normal acceleration mode first pattern P1 and a normal acceleration mode second pattern P2. The normal acceleration mode first pattern P1 is used when the vehicle speed V of the motor vehicle 1 is larger than a second predetermined speed V2 and indicates an increase of the output torque or the vehicle motor 4 as time elapses. The normal acceleration mode second pattern P2 is used when the vehicle speed V is not smaller than zero and is not larger than the second predetermined speed V2 and indicates an increase of the output torque of the electric motor 4 as time elapses.

For example, the second predetermined speed V2 is a speed at which the motor vehicle 1 is driven slowly, so that the motor vehicle 1 can be brought to a halt immediately when the drive depresses a brake pedal. The speed which is not smaller than zero and not larger than the second predetermined speed V2 includes zero and the second predetermined speed.

Figure 2:
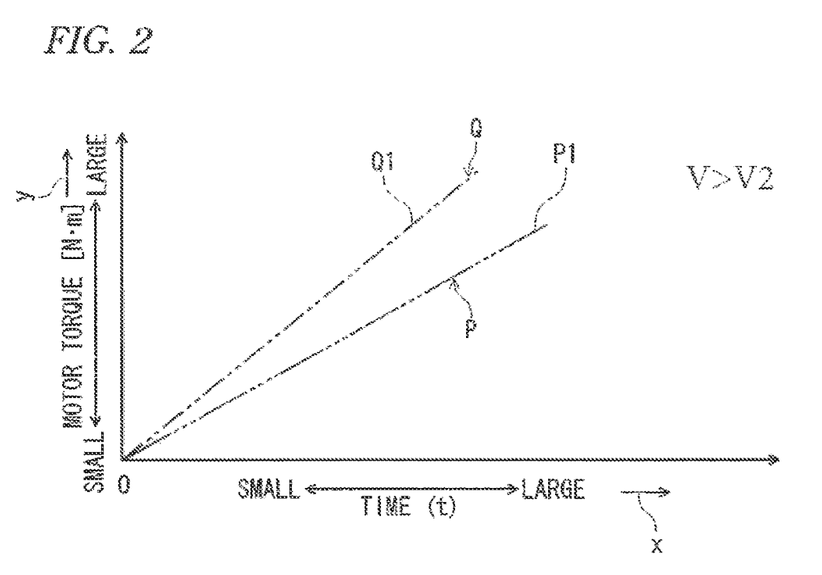
FIG. 2 is a graph showing a first pattern of a normal acceleration mode and a first pattern of a rapid acceleration mode of the output torque control system according to the embodiment of the invention.

FIG. 2 shows the normal acceleration mode first pattern P1. In FIG. 2, an axis of abscissas denotes time. The axis of abscissas indicates that time elapses as it extends along a direction indicated by an arrow X. In FIG. 2, an axis of ordinates denotes the output torque of the electric motor 4. The axis of ordinates indicates that the output torque increases as it extends along a direction indicated by an arrow Y.

In FIG. 2, the normal acceleration mode first pattern P1 is indicated by a three-point chain line. In this embodiment, the output torque of the electric motor 4 which is indicated by the normal mode acceleration first pattern P1 increases proportionally as time elapses. The normal mode acceleration first pattern P1 is set so that an appropriate acceleration can be obtained during a normal acceleration. When referred to in this specification, the appropriate acceleration is an acceleration required when the motor vehicle 1 is driven to be accelerated moderately and can be obtained through experiments.

Figure 3:
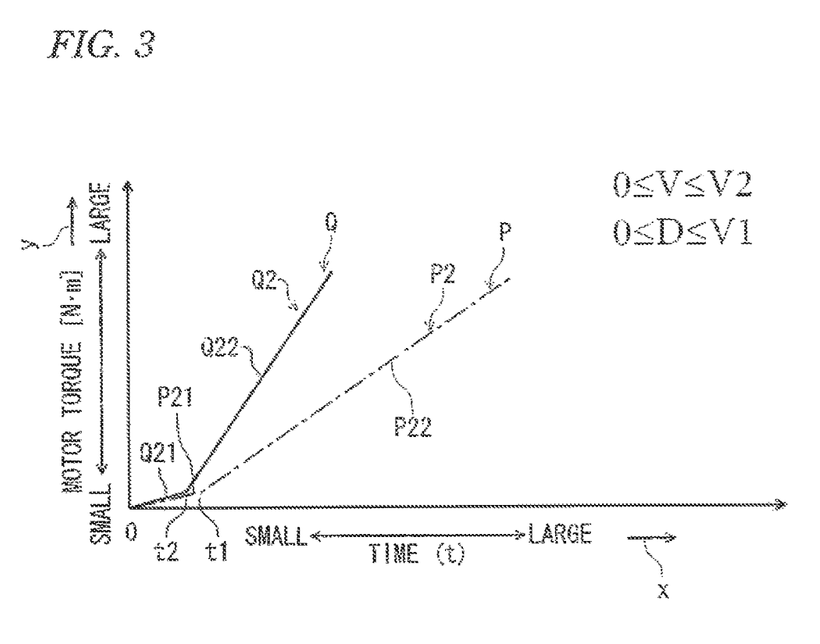
FIG. 3 is a graph showing a second pattern of the normal acceleration mode and a second pattern of the rapid acceleration mode of the output torque control system according to the embodiment of the invention.

FIG. 3 shows the normal acceleration mode second pattern P2. In FIG. 3, an axis of abscissas and an axis of ordinates denote time and the output torque of the electric motor 4, respectively, in the same way as in FIG. 2. In FIG. 3, the normal acceleration mode second pattern P2 is indicated by an alternate long and short dash line. As is shown in FIG. 3, the normal acceleration mode second pattern P2 has a first portion P21 and a second portion P22.

The first portion P21 indicates an increase of the output torque of the electric motor 4 as time elapses from the start of depression of the accelerator pedal 30 until a first predetermined time t1 elapses. The first portion P21 is used during the first predetermined time t1. The second portion P22 indicates an increase of output torque of the electric motor 4 as time elapses after the first predetermined time t1 has elapsed. The second portion P22 is not used during the first predetermined time t1.

The first and second portions P21, P22 both indicate that the output torque of the electric motor 4 increases proportionately as time elapses. A gradient of the increase of the output torque of the electric motor 4 indicated by the first portion P21 is smaller than a gradient of the increase of the output torque of the electric motor 4 indicated by the second portion P22 (initial output torque information). The first portion P21 is provided so as to prevent the rapid acceleration of the motor vehicle 1 immediately after the depression of the acceleration pedal 30 when the motor vehicle 1 is started.

A period of time from the start of depression of the accelerator pedal 30 until the first predetermined time t1 is an example of an initial stage of the depression of the accelerator pedal 30 according to the invention. In this case, the first predetermined time t1 is included in the range of the initial stage of the depression of the accelerator pedal 30. The second portion P22 is an example of other stages of the depression of the accelerator pedal 30 according to the invention.

The gradient of the second portion P22 is steeper than the gradient of the normal acceleration mode first pattern P1 shown in FIG. 2. This is intended to accelerate the motor vehicle 1 quickly when the vehicle speed of the motor vehicle 1 is not larger than the second predetermined speed V2. Because of this, when comparing a case where the vehicle speed is not larger than the second predetermined speed V2 with a case where the vehicle speed is other than not larger than the second predetermined speed V2, even with the same depressing speed of the acceleration pedal 30, the output torque of the electric motor 4 increases more quickly when the vehicle speed is not larger than the second predetermined speed V2 than when the vehicle speed is other than not larger than the second predetermined speed V2. Because of this, the vehicle speed of the motor vehicle 1 increases more quickly when the vehicle speed is not larger than the second predetermined speed V2 than when the vehicle speed is other than not larger than the second predetermined speed V2. In this state, the depressing speed D of the acceleration pedal 30 is larger than zero and is not larger than the first predetermined speed V1.

When the motor vehicle 1 is in the rapid acceleration mode, the main control unit 80 controls the output torque of the electric motor 4 along a output torque rising pattern Q for the rapid acceleration mode. The main control unit 80 holds information on the output torque rising pattern Q for rapid acceleration mode in the storage unit in advance.

The output torque rising pattern Q for the rapid acceleration mode has a rapid acceleration mode first pattern Q1 and a rapid acceleration mode second pattern Q2. The rapid acceleration mode first pattern Q1 is used when the vehicle speed of the motor vehicle 1 is larger than the second predetermined speed V2 and indicates an increase of the output torque of the electric motor 4 as time elapses. The rapid acceleration mode second pattern Q2 is used when the vehicle speed is not smaller than zero and is not larger than the second predetermined speed V2 and indicates an increase of the output torque of the electric motor 4 as time elapses. When referred to in the specification, the speed which is not smaller than zero and is not larger than the second predetermined speed V2 conceptually includes both zero and the second predetermined speed.

FIG. 2 shows the rapid acceleration mode first pattern Q1. In FIG. 2, the rapid acceleration mode first pattern Q1 is indicated by a two-dot chain line. In this embodiment, the output torque of the electric motor 4 indicated by the rapid acceleration mode first pattern Q1 increases proportionally as time elapses. In addition, a gradient of the rapid acceleration mode first pattern Q1 is larger than a gradient of the normal acceleration mode first pattern P1.

The rapid acceleration mode first pattern Q1 is set so that an appropriate acceleration is obtained when the motor vehicle 1 is accelerated rapidly. When referred to in this specification, the appropriate acceleration for rapid acceleration is acceleration required when the motor vehicle 1 is accelerated rapidly and can be obtained through experiments.

FIG. 3 shows the rapid acceleration mode second pattern Q2. In FIG. 3, the rapid acceleration mode second pattern Q2 is indicated by a solid line. As is shown in FIG. 3, the rapid acceleration mode second pattern Q2 has a first portion Q21 and a second portion Q22. The first portion Q21 indicates an increase of the output torque of the electric motor 4 as time elapses during a period of time from the start of depression of the acceleration pedal 30 until a second predetermined time t2 elapses. The second portion Q22 indicates an increase of the output torque of the electric motor 4 as time elapses after the second predetermined time t2 has elapsed. Until the second predetermined time t2 elapses, the first portion Q21 is used and the second portion Q22 is not used.

The first and second portions Q21, Q22 both indicate that the output torque of the electric motor 4 increases proportionally as time elapses. A gradient of the increase of the output torque of the electric motor 4 indicated by the first portion Q21 is smaller than a gradient of the increase of the output torque of the electric motor 4 indicated by the second portion Q22 (initial output torque information). The first portion Q21 is provided to prevent the rapid acceleration of the motor vehicle 1 immediately after the depression of the acceleration pedal 30 when the motor vehicle 1 is started from a halt. Time spent from the start of the acceleration pedal 30 until the second predetermined time t2 constitutes an example of an initial stage of the depression of the acceleration pedal 30 according to the invention. In this case, the second predetermined time t2 is included in the initial stage of the depression of the acceleration pedal 30. The second portion Q22 constitutes an example of other stages of the depression of the acceleration pedal 30 according to the invention.

The gradient of the second portion Q22 is steeper than the gradient of the rapid acceleration mode first pattern Q1 shown in FIG. 2. This is intended to accelerate the motor vehicle 1 quickly when the vehicle speed of the motor vehicle 1 is not larger than the second predetermined speed V2. When comparing a case where the vehicle speed is not larger than the second predetermined speed V2 with a case where the vehicle speed is other than not larger than the second predetermined speed V2, even with the same depressing speed of the acceleration pedal 30, the output torque of the electric motor 4 increases more quickly when the vehicle speed is not larger than the second predetermined speed V2 than when the vehicle speed is other than not larger than the second predetermined speed V2. Because of this, the vehicle speed of the motor vehicle 1 increases more quickly when the vehicle speed is not larger than the second predetermined speed V2 than when the vehicle speed is other than not larger than the second predetermined speed V2. In this state, the depressing speed of the acceleration pedal 30 is larger than the first predetermined speed V1.

The gradients of the first portions P21, Q21 are the same. The gradient of the second portion Q22 is larger than the gradient of the second portion P22.

As has been described above, the motor vehicle 1 is accelerated faster in the rapid acceleration mode than in the normal acceleration mode, in the rapid acceleration mode. In addition, in both the normal acceleration mode and the rapid acceleration mode, the motor vehicle 1 is accelerated faster when the vehicle speed of the motor vehicle 1 is not larger than the second predetermined speed V2 than when the vehicle speed is other than not larger than the second predetermined speed V2.

In this embodiment, a threshold which separates the normal acceleration mode first pattern P1 from the normal acceleration mode second pattern P2 and a threshold which separates the rapid acceleration mode first pattern Q1 from the rapid acceleration mode second pattern Q2 are described as being set at the same value, which is the second predetermined speed V2. However, these thresholds may be set to different predetermined speeds.

The electric motor 4, the main control unit 80, the acceleration sensor 40, the depressing speed detection unit 50, the vehicle speed sensor 60, the inverter 22 and the output torque sensor 70 make up the output torque control system 100 which controls the output torque of the electric motor 4. The output torque control system 100 constitutes an example of an output torque control system according to the invention.

The acceleration sensor 40 and the depressing speed detection unit 50 constitute an example of a depressing speed detection unit according to the invention. The main control unit 80, the motor control unit 23 and the inverter 22 constitute an example of a control unit according to the invention. The main control unit 80 constitutes an example of an acceleration mode detection unit according to the invention. The vehicle speed sensor 60 and the main control unit 80 constitute an example of a vehicle speed detection unit according to the invention.

The output torque rising pattern P for the normal acceleration mode constitutes an example of output information according to the invention. The output torque rising pattern Q for the rapid acceleration mode constitutes an example of output information according to the invention.

The second predetermined speed V2 constitutes an example of a predetermined speed according to the invention. The normal acceleration mode first pattern P1 constitutes an example of first information according to the invention. The rapid acceleration mode first pattern Q1 constitutes an example of first information according to the invention. The second portions P22, Q22 constitute an example of second information according to the invention.

Figure 4:
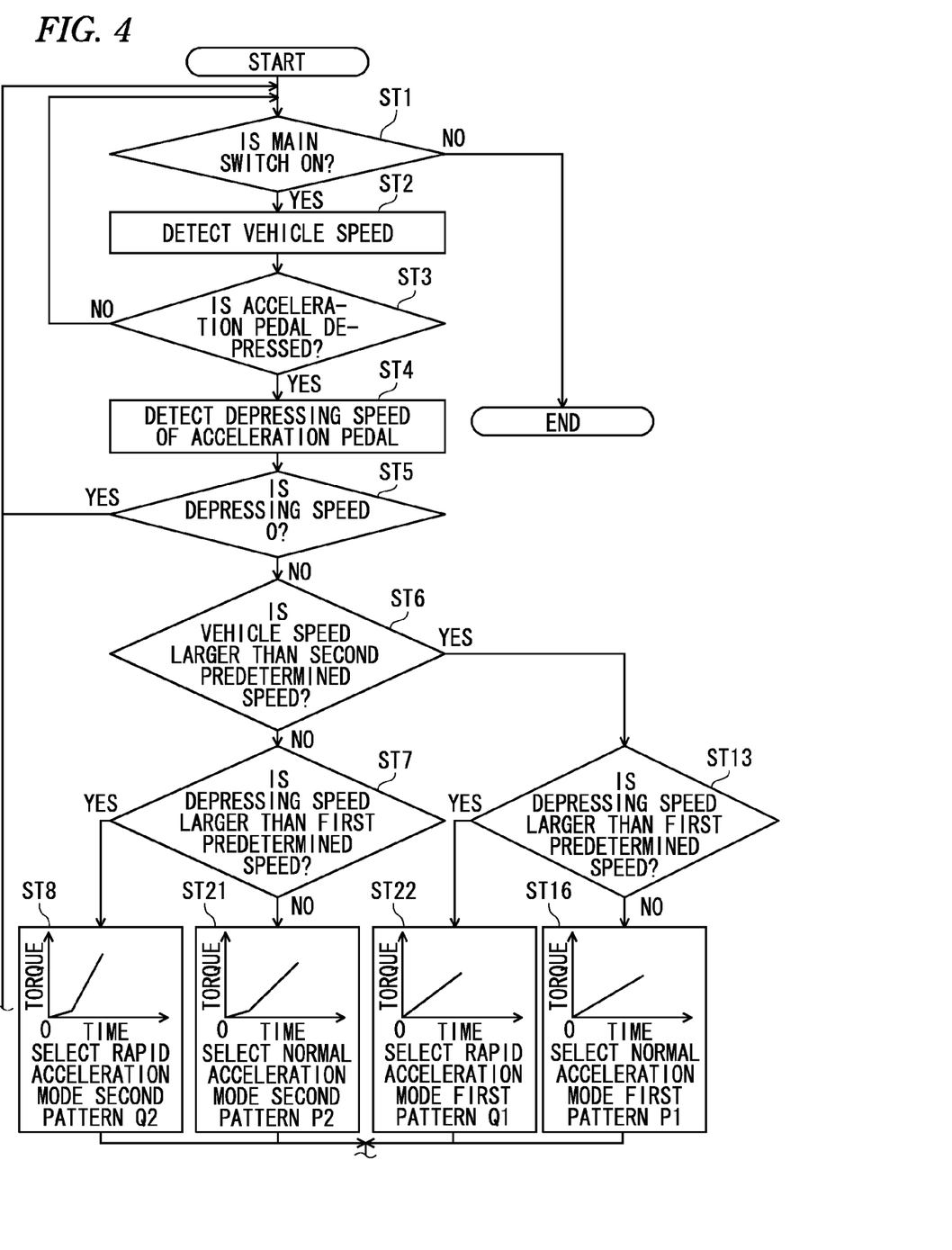
FIG. 4 is a flowchart showing operations of the output torque control system of the embodiment of the invention shown in FIG. 1.
Figure 5:
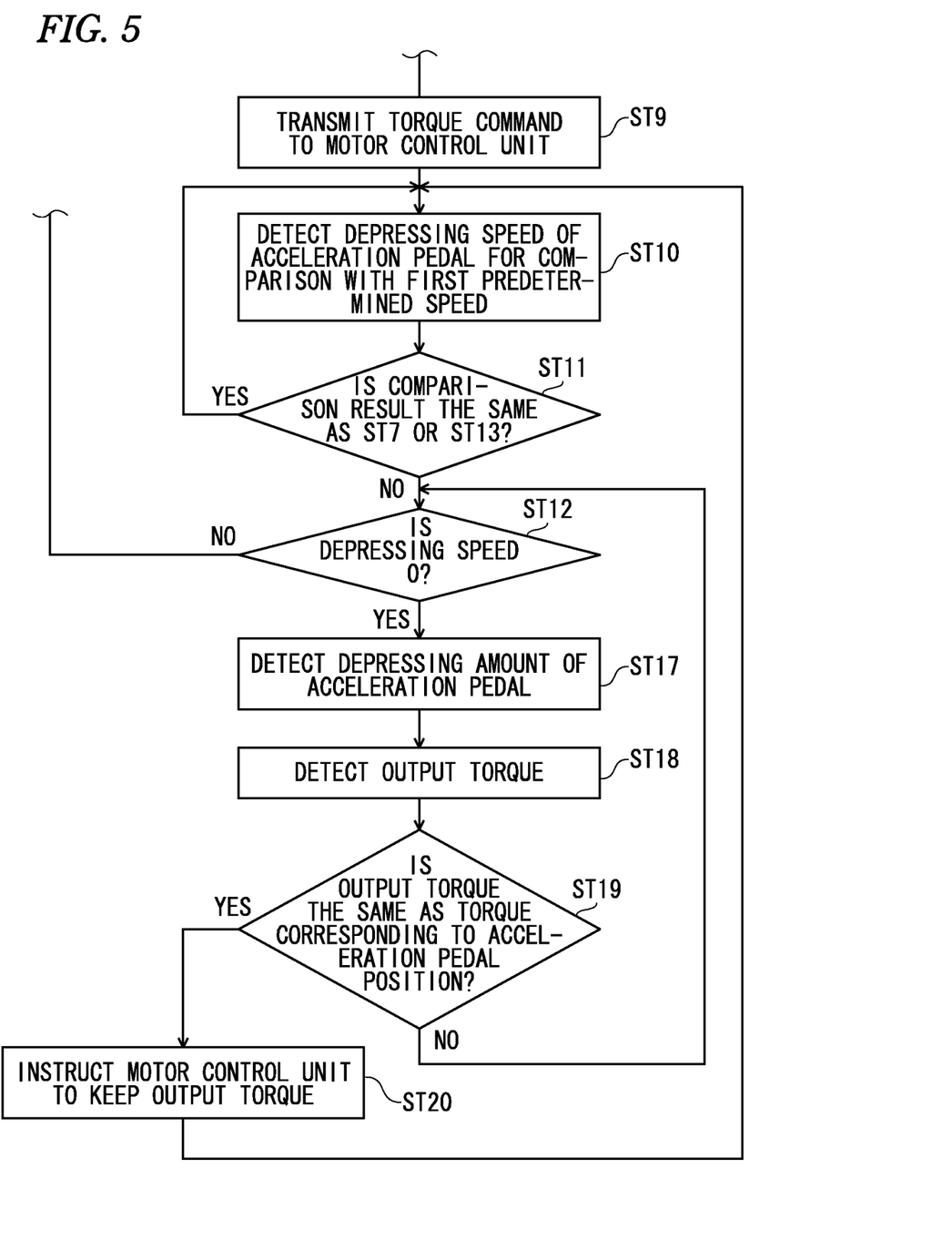
FIG. 5 is a flowchart showing operations of the output torque control system of the embodiment of the invention shown in FIG. 1.
Figure 6:
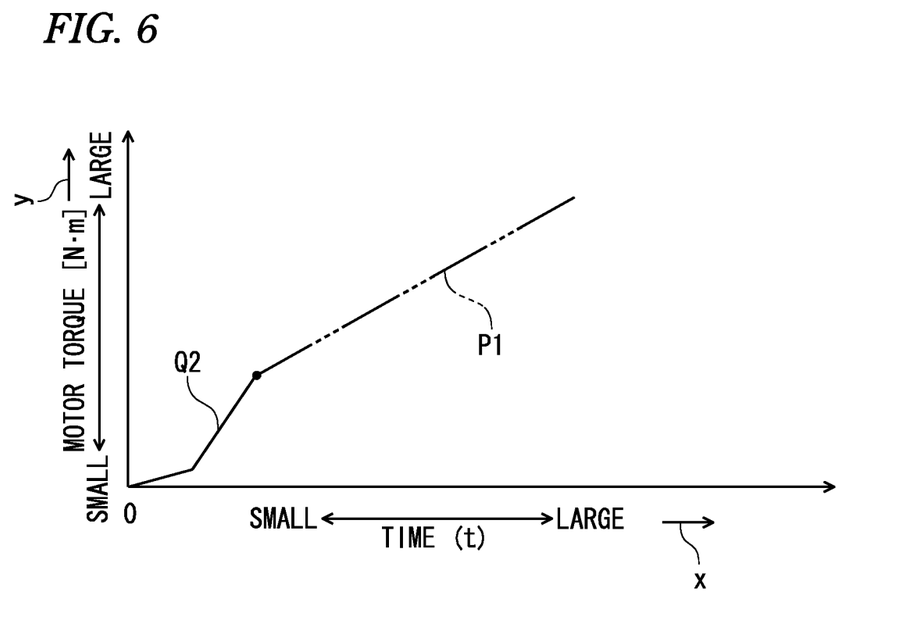
FIG. 6 is a graph showing a change in output torque of an electric motor when the motor vehicle shown in FIG. 1 starts from a halt in the rapid acceleration mode to reach a speed which surpasses a second predetermined speed and is then shifted into the normal acceleration mode for further acceleration.

Next, the operation of the output torque control system 100 will be described. FIGS. 4, 5 are flowcharts showing examples of operations of the output torque control system 100. Firstly, operations of the output torque control system 100 will be described which are performed when the motor vehicle 1 at a halt is started in the rapid acceleration mode to reach a speed which surpasses the second predetermined speed V2 and is then shifted into the normal acceleration mode for further acceleration. FIG. 6 shows a change in output torque of the electric motor 4 when the motor vehicle 1 at a halt is started in the rapid acceleration mode to reach a speed which surpasses the second predetermined speed V2 and is then shifted into the normal acceleration mode for further acceleration.

The acceleration mode shown in FIG. 6 includes, as depressing operations of the acceleration pedal 30 performed by the driver, a first operation in which the acceleration pedal 30 is depressed so as to accelerate the motor vehicle 1 in the rapid acceleration mode and a second operation in which the acceleration pedal 30 is depressed to accelerate the motor vehicle 1 in the normal acceleration mode after the completion of the first operation.

Figure 7:
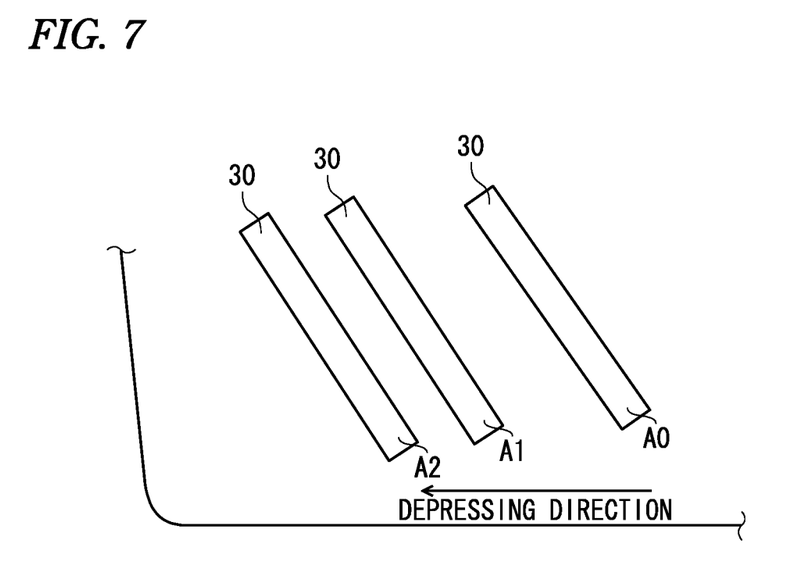
FIG. 7 is a schematic drawing showing depressing operations of an accelerator pedal when the motor vehicle shown in FIG. 1 starts from a halt in the rapid acceleration mode to reach the speed which surpasses the second predetermined speed and is then shifted into the normal acceleration mode for further acceleration.

FIG. 7 is a schematic drawing showing the depression of the acceleration pedal 30 which is effected in the first and second operations. An initial position of the acceleration pedal 30 which is a position where the acceleration pedal 30 is not depressed is referred to as A0, a first position which is a final position of the acceleration pedal 30 which is depressed in the first operation is referred to as A1, and a second position which is a final position of the acceleration pedal 30 which is depressed in the second operation is referred to as A2. Specifically, the driver depresses the acceleration pedal 30 down to the first position A1 in the first operation. Then, after the acceleration pedal 30 has been depressed down to the first position A1, the driver depresses the acceleration pedal 30 down to the second position A2.

As has been described above, the first operation is the acceleration mode, and therefore, the depressing speed of the acceleration pedal 30 from the initial position A0 to the first position A1 surpasses the first predetermined speed V1 in either of the positions. The second operation is the normal acceleration mode, and therefore, the depressing speed of the acceleration pedal 30 from the first position A1 to the second position A2 is larger than zero and is not larger than the first predetermined speed V1 in either of the positions.

As is shown in FIG. 4, in step ST1, the main control unit 80 determines whether or not a main switch is in an ON state. The ON state of the main switch is a state in which the motor vehicle 1 in the drive state is allowed to run when the acceleration pedal 30 is depressed. The main control unit 80 starts to operate when an electric system of the motor vehicle 1 is put in an ON state. Because of this, even with the main switch being not in the ON state, the main control unit 80 starts to operate. In this description, the main switch is in the ON state, and therefore, the operation of the output torque control system 100 then proceeds to step ST2.

The main control unit 80 detects a vehicle speed in step ST2. Specifically speaking, the main control unit 80 detects a vehicle speed based on an output signal received from the vehicle speed sensor 60. In this description, the motor vehicle 1 starts from a halt, and therefore, the main control unit 80 detects that the vehicle speed of the motor vehicle 1 is zero. Then, the operation proceeds to step ST3.

In step ST3, the main control unit 80 determines whether or not the acceleration pedal 30 is depressed. Specifically speaking, the main control unit 80 determines whether or not the acceleration pedal 30 is depressed based on an output signal received from the acceleration sensor 40. In this description, the acceleration pedal 30 is depressed, and therefore, the main control unit 80 determines that the acceleration pedal 30 is depressed. Then, the operation proceeds to step ST4.

In step ST4, the main control unit 80 requires the depressing speed detection unit 50 to output information on the depressing speed of the acceleration pedal 30. By doing this, the main control unit 80 obtains the vehicle speed of the motor vehicle 1. Then, the operation proceeds to step ST5.

In step ST5, the main control unit 80 determines whether or not the depressing speed obtained in step ST4 is zero. In this description, the motor vehicle 1 starts in the acceleration mode, and therefore, the depressing speed is not zero. The main control unit 80 determines that the depressing speed is not zero. Then, the operation proceeds to step ST6.

In step ST6, the main control unit 80 determines whether or not the vehicle speed detected in step ST2 is larger than the second predetermined speed V2. In this description, the motor vehicle 1 starts from a halt, and therefore, the vehicle speed detected in step ST2 is zero. Because of this, the main control unit 80 determines that the vehicle speed is not larger than the second predetermined speed V2. Then, the operation proceeds to step ST7.

In step ST7, the main control unit 80 determines whether or not the depressing speed of the acceleration pedal 30 obtained in step ST4 is larger than the first predetermined speed V1. In the first operation, the depressing speed is larger than the first predetermined speed V1, and therefore, the main control unit 80 determines that the depressing speed is larger than the first predetermined speed V1. Then, the operation proceeds to step ST8.

In step ST8, in order to control the increase in output torque of the electric motor 4, the main control unit 80 selects the rapid acceleration mode second pattern Q2 indicated by the solid line in FIG. 3. Then, the operation proceeds to step ST9 shown in FIG. 5.

In step ST9, the main control unit 80 sends out a command to the motor control unit 23 so as to increase the output torque of the electric motor 4 along the acceleration pattern selected. Here, the math control unit 80 sends out a command to the motor control unit 23 so as to increase the output of the electric motor 4 along the rapid acceleration mode second pattern Q2 selected in step ST8. The motor control unit 23 controls the inverter 22 based on the command from the main control unit 80. As a result of this, the output torque of the electric motor 4 increases as is shown in FIG. 6. Then, the operation proceeds to step ST10.

In step ST10, the main control unit 80 obtains a depressing speed of the acceleration pedal 30. The main control unit 80 requires the depressing speed detection unit 50 to output information on the depressing speed of the acceleration pedal 30. As a result of this, the main control unit 80 obtains information on the depressing speed of the acceleration pedal 30 at this point in time. Then, the main control unit 80 compares the depressing speed obtained newly in this step with the first predetermined speed V1. In the first operation, the depressing speed is larger than the first predetermined speed V1. The main control unit 80 determines that the depressing speed detected newly in this step is larger than the first predetermined speed V1. Then, the operation proceeds to step ST11.

In step ST11, the main control unit 80 determines whether or not the result of the comparison made in step ST10 is the same as the result of a determination made in either of steps ST7 and ST13, which will be described before, which occurs immediately therebefore. In this description, step ST7 constitutes a step occurring immediately before. The main control unit 80 determines that the depressing speed is larger than the first predetermined speed V1 in step ST7 and determines that the depressing speed is larger than the first predetermined speed V1 in step ST10. Because of this, the main control unit 80 determines that the comparison results are the same. Then, the operation returns to step ST10.

During the first operation, the operation proceeds from step ST1 to step ST11, and thereafter, the operations in steps ST10, ST11 are repeated. During this, the motor control unit 23 controls the inverter 22 based on the output torque output command received from the main control unit 80 in step ST9. As a result of this, as is shown in FIG. 6, the output torque of the electric motor 4 increases along the rapid acceleration mode second pattern Q2 after the start of the motor vehicle 1.

Then, when the first operation is completed and the second operation is started, the depressing speed of the acceleration pedal 30 by the driver becomes equal to or smaller than the first predetermined speed V1. Because of this, the main control unit 80 determines that the depressing speed is not larger than the first predetermined speed V1 in step ST10. Then, the operation proceeds to step ST11.

In step ST11, the control unit 80 determines that the result of the determination made in step ST7, which is the step of steps ST7 and ST13 which occurs immediately before, differs from the result of a determination made in step ST13. Specifically speaking, as has been described above, it is determined in step ST7 that the depressing speed is larger than the first predetermined speed V1, and it is determined in step ST10 which occurs immediately before that the depressing speed is not larger than the first predetermined speed V1. When it is determined that the comparison results are different, the operation proceeds to step ST12.

In step ST12, the main control unit 80 determines whether or not the depressing speed of the acceleration pedal 30 confirmed in step ST10 is zero. The depressing speed of the acceleration pedal 30 is not zero during the second operation. The main control unit 80 determines that the depressing speed is not zero. Then, the operation returns to step ST1 and proceeds to step ST2.

In step ST2, the main control unit 80 confirms the vehicle speed. The motor vehicle 1 is accelerated as a result of the first operation, and therefore, the vehicle speed is larger than the second predetermined speed V2. Then, the operation passes through step ST3 to proceed to step ST4.

In step ST4, the main control unit 80 confirms newly the depressing speed of the acceleration pedal 30 based on the output signal of the depressing speed detection unit 50. In this description, the depressing speed of the acceleration pedal 30 is not smaller than zero and is not larger than the first predetermined speed V1 in the second operation. Then, the operation passes through step ST5 to proceed to step ST6.

In step ST6, the main control unit 80 determines whether or not the vehicle speed confirmed in step ST3 is larger than the second predetermined speed V2. As has been described above, the vehicle speed is larger than the second predetermined speed V2, and therefore, the main control unit 80 determines that the vehicle speed is larger than the second predetermined speed V2. Then, the operation proceeds to step ST13.

In step ST13, the main control unit 80 determines whether or not the depressing speed of the acceleration pedal 30 confirmed in step ST4 is larger than the first predetermined speed V1. In the second operation, the depressing speed is not larger than the first predetermined speed V1. The main control unit 80 determines that the depressing speed of the acceleration pedal 30 is larger than zero and is not larger than the first predetermined speed V1. Then, the operation proceeds to step ST16.

In step ST16, the main control unit 80 selects the normal acceleration mode first pattern P1 as an increasing pattern of the output torque which is produced when the output torque of the electric motor 4 increases. Then, the operation proceeds to step ST9.

In step ST9, the main control unit 80 sends out a command to the motor control unit 23 so that the output torque of the electric motor 4 increases along the normal acceleration mode first pattern P1. The motor control unit 23 controls the inverter 22 based on the command from the main control unit 80. As a result of this, as is shown in FIG. 6, the output torque of the electric motor 4 increases along the normal acceleration mode first pattern P1 in the second operation. Then, the operation proceeds to step ST10

The operations in steps ST10 to ST11 are repeated during the second operation, that is, in a state in which the acceleration pedal 30 has not reached the second position A2. As a result of this, the output torque of the electric motor 4 increases along the normal acceleration mode first pattern P1.

When the second operation is completed, in other words, when the acceleration pedal 30 has reached the second position A2, the driver stops a further depression of the acceleration pedal 30. Namely, the depressing speed of the acceleration pedal 30 becomes zero. The main control unit 80 detects based on an output signal from the depressing speed detection unit 50 that the depressing speed of the acceleration pedal 30 is zero in step ST10. Then, the main control unit 80 determines that the depressing speed of the acceleration pedal 30 is not larger than the first predetermined speed V1. Following this, the operation proceeds to step ST11. In step ST11, the main control unit 80 determines that the comparison results are different. Then, the operation proceeds to step ST17.

In step ST17, the main control unit 80 detects a depressing amount of the acceleration pedal 30. Following this, the operation proceeds to step ST18. In step ST18, the main control unit 80 detects an output torque of the electric motor 4 based on an output signal from the output torque sensor 70. Then, the operation proceeds to step ST19.

In step ST19, the main control unit 80 determines whether or not the output torque of the electric motor 4 has reached an output torque corresponding to the depressing amount of the acceleration pedal 30 detected in step ST17. When referred to in step ST17, the depressing amount means a depressing amount of the acceleration pedal 30 from the initial position A0 to the second position A2.

When the output torque of the electric motor 4 has not yet reached the output torque corresponding to the depressing amount of the acceleration pedal 30, the operation returns to step ST12. In such a state that the output torque of the electric motor 4 has not reached yet the output torque corresponding to the depressing amount of the acceleration pedal 30 after the completion of the second operation, the operations in steps ST12, ST17, ST18 and ST19 are repeated. During this, the motor control unit 23 controls the inverter 22 so that the torque is outputted from the electric motor 4 in accordance with the normal acceleration mode first pattern P1 selected in step ST16.

When the output torque of the electric motor 4 has reached the output torque corresponding to the depressing amount of the acceleration pedal 30, the operation proceeds to step ST20 from step ST19. In step ST20, the main control unit 80 sends out a command to the motor control unit 23 so the output torque corresponding to the depressing amount of the acceleration pedal 30 is maintained. The motor control unit 23 controls the inverter 22 so that the output torque corresponding to the depressing amount of the acceleration pedal 30 is maintained. As a result of this, the output torque of the electric motor 4 is maintained to a value corresponding to the depressing amount of the acceleration pedal 30. Then, the operation returns to step ST12.

The operations in steps ST12, ST17, ST18, ST19 and ST20 are repeated while the acceleration pedal 30 is held in the second position A2. When the main switch is switched off, determining that the main switch has been switched off in step ST1, the main control unit 80 stops the operation thereof as the output torque control system 100.

Figure 8:
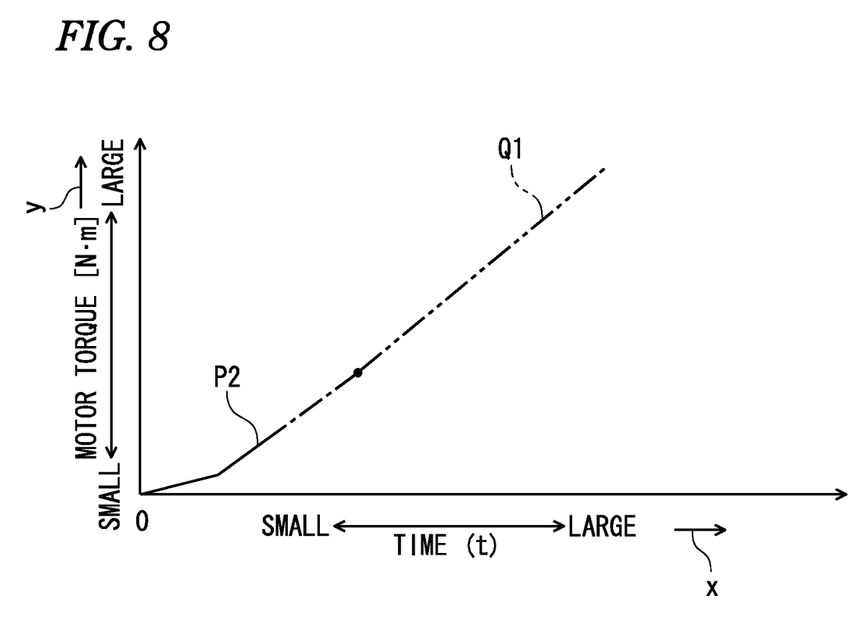
FIG. 8 is a graph showing a change in output torque of the electric motor when the motor vehicle shown in FIG. 1 starts from a halt in the normal acceleration mode to reach the speed which surpasses the second predetermined speed and is then shifted into the rapid acceleration mode for further acceleration.

Next, a case will be described in which the motor vehicle 1 is started from a halt in the normal acceleration mode to thereafter be accelerated further in the rapid acceleration mode. FIG. 8 shows a change in output torque of the electric motor 4 when the motor vehicle 1 starts from a halt in the normal acceleration mode to reach the speed which surpasses the second predetermined speed V2 and is then shifted into the rapid acceleration mode for further acceleration.

The acceleration mode shown in FIG. 8 includes, as depressing operations of the acceleration pedal 30 by the driver, a third operation in which the acceleration pedal 30 is depressed so as to accelerate the motor vehicle 1 in the normal acceleration mode and a fourth operation in which the acceleration pedal 30 is depressed further so as to accelerate the motor vehicle 1 in the rapid acceleration mode.

Figure 9:
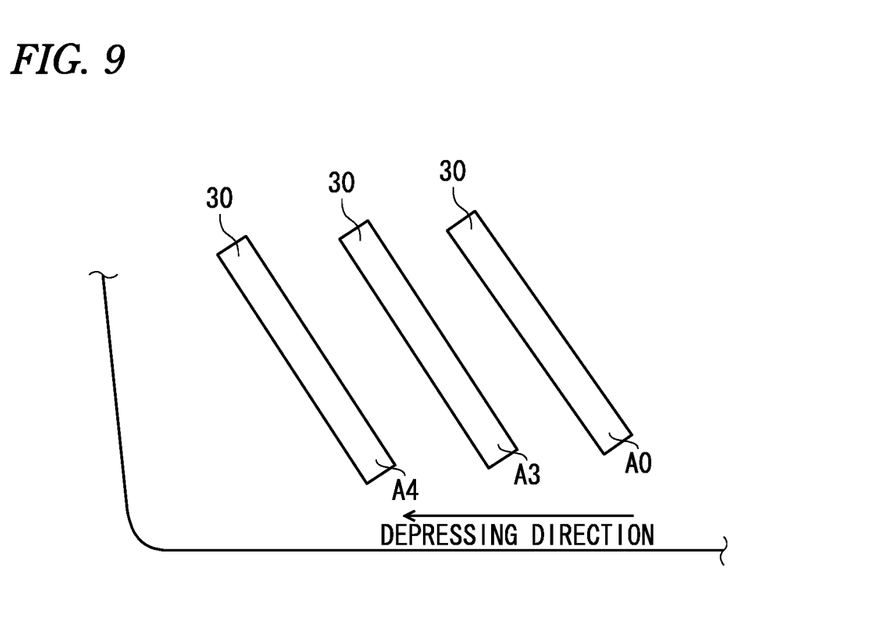
FIG. 9 is a schematic drawing showing depressing operations of the accelerator pedal when the motor vehicle shown in FIG. 1 starts from a halt in the normal acceleration mode to reach the speed which surpasses the second predetermined speed and is then shifted into the normal acceleration mode for further acceleration.

FIG. 9 is a schematic drawing showing depressing operations of the accelerator pedal 30 in the third and fourth operations. A final position of the acceleration pedal 30 which is depressed in the third operation is referred to as a third position A3, and a final position of the acceleration pedal 30 which is depressed in the fourth operation is referred to as a fourth position A4. The driver depresses the acceleration pedal 30 from the initial position A0 to the third position A3 in the third operation. Then, after having depressed the acceleration pedal 30 to the third position A3, the driver depresses the acceleration pedal 30 to the fourth position A4.

As has been described above, the third operation is the normal acceleration mode, and therefore, the depressing speed of the acceleration pedal 30 from the initial position A0 to the third position A3 is larger than zero and is not larger than the first predetermined speed V1 in either of the positions. The fourth operation is the rapid acceleration mode, and therefore, the depressing speed of the acceleration pedal 30 from the third position A3 to the fourth position A4 is larger than the first predetermined speed V1 in either of the positions.

In this description, the operation proceeds to step ST7 from step ST6. In step ST7, the main control unit 80 determines whether or not the depressing speed of the acceleration pedal 30 detected in step ST4 is larger than the first predetermined speed V1. In this description, the motor vehicle 1 starts from a halt in the normal acceleration mode, and therefore, the main control unit 80 determines that the depressing speed is not larger than the first predetermined speed V1. Then, the operation proceeds to step ST21.

In step ST21, the main control unit 80 selects the normal acceleration mode second pattern P2 shown in FIG. 2 as a pattern to be followed when increasing the output torque of the electric motor 4. Then, the operation proceeds to step ST9. In step ST9, the main control unit 80 sends out a command to the motor control unit 23 so that the output torque of the electric motor 4 increases along the pattern selected. Following this, the operation proceeds to step ST10. The operations in steps ST10 and ST11 are repeated until the compression of the third operation, in other words, until the acceleration pedal 30 reaches the third position A3. The motor control unit 23 controls the inverter 22 so that the output torque of the electric motor 4 increases along the normal acceleration mode second pattern P2.

When the third operation is completed, the operation returns to step ST1 from step ST12. Then, the operation proceeds to step ST13 from step ST6. In the fourth operation, the depressing speed of the acceleration pedal 30 is larger than the first predetermined speed V1. In step ST13, the main control unit 80 determines that the depressing speed is larger than the first predetermined speed V1. Then, the operation proceeds to step ST22.

In step ST22, the main control unit 80 selects the rapid acceleration mode first pattern Q1 as a pattern to be followed when the output torque of the electric motor 4 increases. Then, the operation proceeds to step ST9. In step ST9, the main control unit 80 sends out a command to the motor control unit 23 so that the output torque of the electric motor 4 increases along the acceleration pattern selected. The operations in steps ST10, ST11 are repeated during the fourth operation.

When the fourth operation is completed, the operations in steps ST12, ST17, ST18, ST19 and ST20 are repeated, and the output torque of the electric motor 4 increases until the output torque of the electric motor 4 reaches an output torque corresponding to the fourth position A4. As a result of this, the output torque of the electric motor 4 increases as is shown in FIG. 8.

In the output torque control system 100 which is configured as has been described heretofore, the normal acceleration mode and the rapid acceleration mode are set, and either of the normal acceleration mode and the rapid acceleration mode is selected in accordance with the depressing speed of the acceleration pedal 30. The output torque of the electric motor 4 increases faster in the rapid acceleration mode than in the normal acceleration mode. Because of this, the motor vehicle 1 can be accelerated so as to match the requirement of the driver.

In addition, even in the same acceleration mode, the output torque of the electric motor 4 is made to increase differently. Specifically speaking, when the vehicle speed of the motor vehicle 1 is not larger than the second predetermined speed V2, determining that the motor vehicle 1 is starting from a halt, the output torque of the electric motor 4 increases more quickly than when the vehicle speed is larger than the second predetermined speed V2.

Because of this, when the vehicle speed is not larger than the second predetermined speed V2, the motor vehicle 1 is accelerated quickly even in the event that the depressing operation of the acceleration pedal 30 by the driver is the same as when the vehicle speed is larger than the second predetermined speed V2. Because of this, the driver feels that the motor vehicle 1 is accelerated quickly, and therefore, the drivability is improved.

In addition, in the normal acceleration mode, the increase of the output torque in association with the elapse of time indicated by the first portion P21 is set to be smaller than the increase of the output torque in association with the elapse of time indicated by the second portion P22. Therefore, the rapid acceleration of the motor vehicle 1 is prevented when the motor vehicle 1 is started from a halt. This will be true with the rapid acceleration mode. Further, the first predetermined time t1 during which the first portion P21 of the normal acceleration mode is maintained is longer than the second predetermined time t2 during which the first portion Q21 of the rapid acceleration mode is maintained. In other words, the second predetermined time t2 is set to be shorter than the first predetermined time t1. Due to this, in the rapid acceleration mode, when the motor vehicle 1 starts from a halt, the vehicle speed can be increased more quickly in the rapid acceleration mode than in the normal acceleration mode.

The plural acceleration modes are provided as the acceleration mode of the motor vehicle 1. In this embodiment, as an example, they are the normal acceleration mode and the rapid acceleration mode. Because of this, the motor vehicle 1 can be driven in a finely regulated fashion in accordance with the depression of the acceleration pedal 30 by the driver.

In this embodiment, while the two acceleration modes are used, for example, three or four other acceleration modes may be set in accordance with the depressing speed of the acceleration pedal 30. As with the normal acceleration mode and the rapid acceleration mode, in each of the three or four acceleration modes, the output torque of the electric motor 4 is made to increase differently between when the vehicle speed is not larger than a predetermine speed and when the vehicle speed is larger than the predetermined speed. By increasing the number of acceleration modes, the drivability can be improved further.

In the embodiment, the maps shown in FIGS. 2, 3, 6 and 8 are used as an example of information on the output torque according to the invention. However, information in other forms of information than the maps, for example, information in the form of data may be used as information on the output torque. In short, the output torque information according to the invention may be such as to indicate an increase in the output torque of the electric motor as time elapses.

According to the invention, the output torque control system can be provided which can accelerate the vehicle so as to meet the driver's requirement.

Further, when the vehicle runs at the predetermined speed or slower, the output torque of the electric motor is controlled based on the second information. Because of this, when the speed of the vehicle is slow, the speed of the vehicle can be increased quickly.

Further, by keeping the increase in output torque smaller in the initial stage of depression of the accelerator pedal than in the other stages, a rapid acceleration of the vehicle can be prevented.

The invention is not limited to the embodiment that has been described heretofore without any modification, and therefore, the invention can be embodied by modifying the constituent elements without departing from the spirit and scope of the invention in the stages where the invention is carried out. In addition, various inventions can also be formed by combining variously the plural constituent elements disclosed in the embodiment. For example, some constituent elements may be deleted from the whole constituent elements described in the embodiment described heretofore.

What is claimed is:

1. An output torque control system comprising:
an electric motor configured to rotate a driving wheel to run a vehicle;

a depressing speed detection unit configured to detect a depressing speed at which an accelerator pedal is depressed by a driver of the vehicle; and a control unit configured to control output torque produced by the electric motor, wherein the control unit includes;

an acceleration mode detection unit configured to select a normal acceleration mode which includes output torque information indicating an increased amount of output torque of the electric motor as time elapses or a rapid acceleration mode which includes output torque information indicating the increased amount of output torque of the electric motor as time elapses more largely than in the normal acceleration mode based on a result of a detection by the depressing speed detection unit; and an output torque control unit configured to select one of the output torque information which corresponds to the result of the detection by the acceleration mode detection unit to control the output torque produced by the electric motor based on the selected output torque information, the output torque control system further comprising:

a vehicle speed detection unit configured to detect a vehicle speed of the vehicle, wherein the output torque information of the normal acceleration mode and the output torque information of the rapid acceleration mode include first information indicating the increased amount of the output torque, as time elapses, in a state where the vehicle speed when the accelerator pedal is depressed is larger than a predetermined speed and second information indicating the increased amount of the output torque, as time elapses, in a state where the vehicle speed when the accelerator pedal is depressed is not smaller than zero and not larger than the predetermined speed and indicating the increased amount of the output torque, as time elapses, is larger than the increased amount in the first information, and the output torque control unit, determines whether or not the vehicle speed when the accelerator pedal is depressed is larger than the predetermined speed based on the result of a detection by the vehicle speed detection unit, selects the first information when a detected speed is larger than the predetermined speed, selects the second information when the detected speed is not smaller than zero and not larger than the predetermined speed and controls the output torque of the motor according to the selected information; wherein the second information has initial output torque information which keeps the increased amount of the output torque, as time elapses, smaller during a predetermined period in an initial stage of depression of the accelerator pedal than in other stages, and the predetermined period is set longer in the normal acceleration mode than in the rapid acceleration mode.

* * * * *